United States Patent
Yuasa

(10) Patent No.: US 9,231,343 B2
(45) Date of Patent: Jan. 5, 2016

(54) INLET

(75) Inventor: Hiroaki Yuasa, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/417,937

(22) PCT Filed: Aug. 6, 2012

(86) PCT No.: PCT/JP2012/069961
§ 371 (c)(1),
(2), (4) Date: Jan. 28, 2015

(87) PCT Pub. No.: WO2014/024241
PCT Pub. Date: Feb. 13, 2014

(65) Prior Publication Data
US 2015/0162707 A1    Jun. 11, 2015

(51) Int. Cl.
*H01R 13/627*    (2006.01)
*H01R 13/631*    (2006.01)
*B60L 11/12*    (2006.01)
*B60L 11/14*    (2006.01)
*B60L 11/18*    (2006.01)
*H01R 13/74*    (2006.01)

(52) U.S. Cl.
CPC .......... *H01R 13/6272* (2013.01); *B60L 11/126* (2013.01); *B60L 11/14* (2013.01); *B60L 11/1818* (2013.01); *H01R 13/631* (2013.01); *H01R 13/748* (2013.01)

(58) Field of Classification Search
CPC .......... H01R 13/6275; H01R 13/6272; H01R 13/6273; H01R 13/639; H01R 13/627
USPC .......... 439/358, 352, 357, 310, 304, 569, 573
See application file for complete search history.

(56) References Cited

U.S. PATENT DOCUMENTS

| 8,506,315 B2 * | 8/2013 | Canedo | H01R 13/60 439/310 |
| 9,039,437 B2 * | 5/2015 | Kurumizawa | H01R 13/6397 439/352 |
| 2011/0277516 A1 | 11/2011 | Kahara et al. | |

FOREIGN PATENT DOCUMENTS

| JP | 2011-238529 A | 11/2011 |
| JP | 2011-239620 A | 11/2011 |

* cited by examiner

*Primary Examiner* — Phuong Dinh
(74) *Attorney, Agent, or Firm* — Oliff PLC

(57) ABSTRACT

An inlet is an inlet to which a charging connector is connected when charging a power storage device mounted in a hybrid vehicle from an external power supply. The inlet includes a cylindrical guide wall that guides the charging connector to be connected to the inlet; a flange portion that is provided in a plate shape on an outer periphery of the guide wall, and is fixed to the vehicle; a lever retaining portion that is provided on the outer periphery of the guide wall, and retains the charging connector; and a recessed portion that is provided in a position overlapping with the lever retaining portion when viewed from a connecting direction of the charging connector, and is recessed toward the connecting direction of the charging connector from the flange portion. This kind of structure provides an inlet in which a protruding length from the vehicle side is reduced.

5 Claims, 8 Drawing Sheets

INLET

TECHNICAL FIELD

The invention typically relates to an inlet, and more particularly, relates to an inlet that is provided in a vehicle, and to which a charging connector is connected when charging a power storage device mounted in the vehicle from an external power supply.

BACKGROUND ART

Regarding a related inlet, Japanese Patent Application Publication No. 2011-238529, for example, describes a power supply plug lock device that is aims to make a lock operation an operation according to an intent of a user (Patent Document 1).

In the power supply plug lock device described in Patent Document 1, a charging system for charging a battery is provided in a hybrid-type vehicle. A power supply plug having a nozzle shape is provided on a power supply side of the charging system, and a charging connector is provided as a connecting location of the power supply plug on the vehicle side. An inlet is provided as a connecting port for an electric terminal of the power supply plug, in the charging connector, and a protruding portion is provided on an upper wall surface of this inlet. A lock arm that has a catch is pivotally attached to the power supply plug. The power supply plug is prevented from coming out of the inlet by the catch on the lock arm catching on the protrusion, when connecting the power supply plug to the charging connector.

PRIOR ART DOCUMENT

Patent Document

Patent Document 1: Japanese Patent Application Publication No. 2011-238529

SUMMARY OF THE INVENTION

Problems to be Solved by the Invention

With the power supply plug lock device described in Patent Document 1 above, the protrusion for retaining the lock arm is provided on the upper wall surface of the inlet. With this kind of structure, is it necessary to ensure space for moving the lock arm in above the upper wall surface of the inlet, so the length of the inlet increases. In this case, the power supply plug largely protrudes from the vehicle side while the power supply plug is connected to the charging connector, so the likelihood that a charging worker or the like will contact the power supply plug is greater. Also, if a charging worker or the like contacts the power supply plug, a large amount of stress will be applied to the inlet via the power supply plug.

Therefore, the object of the invention is to solve the problems described above by providing an inlet in which a protruding length from the vehicle side is reduced.

Means for Solving the Problems

The inlet according to the invention is an inlet to which a charging connector is connected when charging a power storage device mounted in a vehicle from an external power supply. The inlet includes a cylindrical guide wall that guides the charging connector to be connected to the inlet; a flange portion that is provided in a plate shape on an outer periphery of the guide wall, and is fixed to the vehicle; a retaining portion that is provided on the outer periphery of the guide wall, and retains the charging connector; and a recessed portion that is provided in a position overlapping with the retaining portion when viewed from a connecting direction of the charging connector, and is recessed toward the connecting direction of the charging connector from the flange portion.

With the inlet structured in this way, the recessed portion is provided in a position overlapping with the retaining portion when viewed from the connecting direction of the charging connector, so a length from the flange portion to a tip end of the guide wall is able to be shortened. As a result, an inlet in which the protruding amount from the vehicle side is reduced is able to be realized.

Also preferably, the recessed portion is provided on a vertically upper side of the guide wall. The recessed portion has a bottom surface that is inclined vertically downward along a near side from a far side in a recessed direction from the flange portion. With the inlet structured in this way, when the recessed portion is provided on the vertically upper side of the guide wall, there is a possibility of a liquid such as rainwater accumulating in the recessed portion. With the invention, liquid is able to be discharged from the recessed portion by the bottom surface that is inclined vertically downward along the near side from the far side in the recessed direction from the flange portion.

Also preferably, the flange portion is fixed to the vehicle such that the guide wall extends in a cylindrical shape in the connecting direction of the charging connector while inclining vertically downward. With the inlet structured in this way, although the likelihood of a liquid such as rainwater accumulating in the recessed portion increases, the liquid is able to be discharged from the recessed portion by the bottom surface that is inclined vertically downward along the near side from the far side in the recessed direction from the flange portion.

Also preferably, at least a portion of the retaining portion is arranged in the recessed portion. With the inlet structured in this way, the length from the flange portion to the tip end of the guide wall is able to be made even shorter.

Also preferably, the guide wall protrudes in a cylindrical shape from the flange portion and the recessed portion when viewed from the connecting direction of the charging connector. A protruding length of the guide wall based on the flange portion is smaller than a protruding length of the guide wall based on the recessed portion. With the inlet structured in this way, the recessed portion is provided in a position overlapping with the retaining portion when viewed from the connecting direction of the charging connector, so the protruding length of the guide wall based on the flange portion is able to be made even shorter.

Also preferably, the guide wall and the flange portion are integrally formed by resin. With the inlet structured in this way, the length from the flange portion to the tip end of the guide wall is set short, so the strength of the guide wall and the flange portion that are integrally formed by resin is able to be realized with an even simpler structure.

Effect of the Invention

As described above, according to the invention, it is possible to provide an inlet in which the protruding length from the vehicle side is reduced.

MODES FOR CARRYING OUT THE INVENTION

Figure 1:
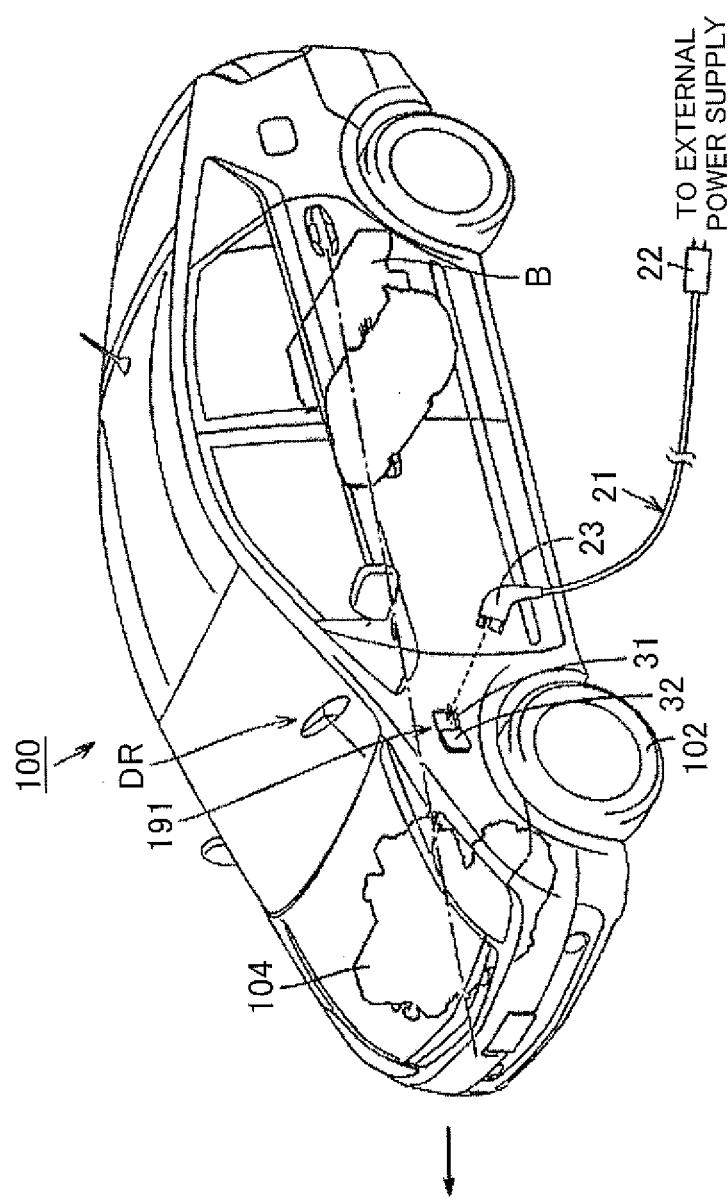
FIG. 1 is a perspective view of the exterior of a hybrid vehicle.

Example embodiments of the invention will be described with reference to the drawings. In the drawings referenced below, like or corresponding members will be denoted by like reference numerals.

Figure 2:
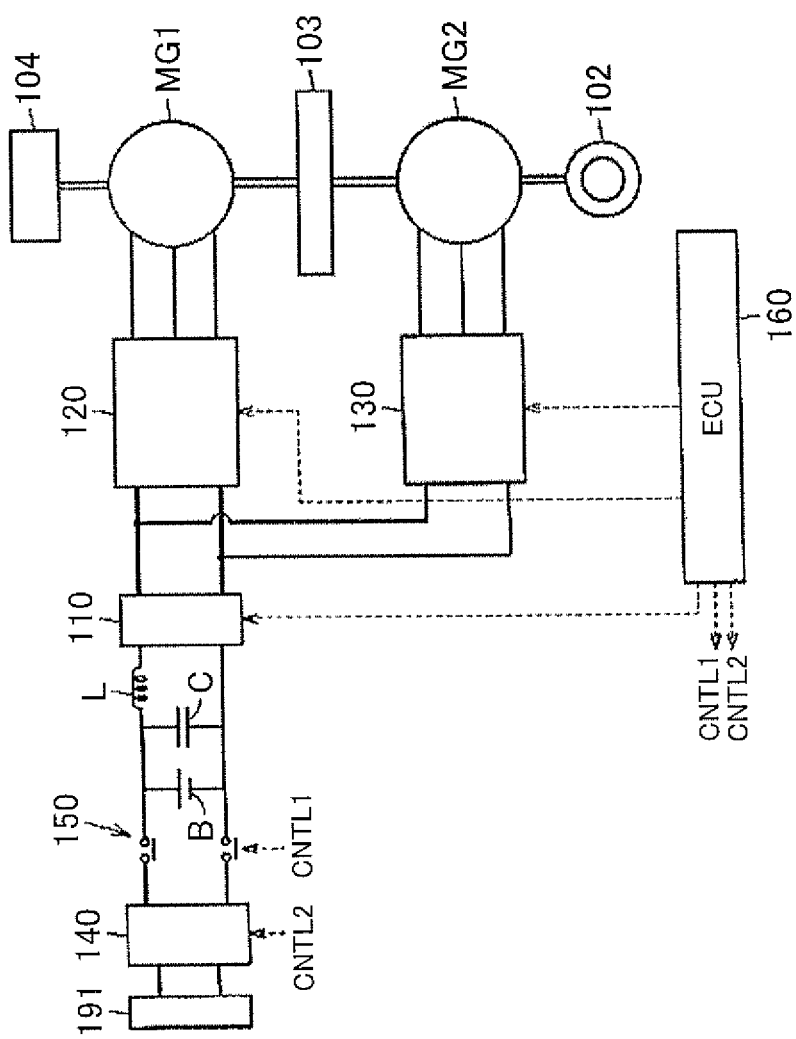
FIG. 2 is a block diagram schematically showing the structure of the hybrid vehicle in FIG. 1.

FIG. 1 is a perspective view of the exterior of a hybrid vehicle. FIG. 2 is a block diagram schematically showing the structure of the hybrid vehicle in FIG. 1.

Referring to FIG. 1 and FIG. 2, the hybrid vehicle 100 has an internal combustion engine such as a gasoline engine or a diesel engine, and an electric motor that is supplied with power from a chargeable-dischargeable battery (secondary battery), as power sources.

First, in describing the overall structure of the hybrid vehicle 100, the hybrid vehicle 100 has an engine 104, motor-generators MG1, MG2, a power split device 103, a battery B, a capacitor C, a reactor L, a converter 110 and inverters 120, 130, and a vehicle ECU (electronic control unit) 160.

The power split device 103 is joined to the engine 104 and the motor-generators MG1, MG2, and distributes power between these. For example, a planetary gear unit having three rotating shafts of a sun gear, a planetary carrier, and a ring gear may be used as the power split device 103. These three rotating shafts are connected to rotating shafts of the engine 104, and the motor-generators MG1, MG2. For example, the engine 104 and the motor-generators MG1, MG2 are able to be mechanically connected by having a rotor of the motor-generator MG1 be hollow and passing a crankshaft of the engine 104 through the center of it.

The rotating shaft of the motor-generator MG2 is joined to a wheel 102 by a reduction gear and a differential gear, not shown. A reducer for the rotating shaft of the motor-generator MG2 may also be incorporated in the inside of the power split device 103.

The motor-generator MG1 is incorporated into the hybrid vehicle 100 as an apparatus that operates as a generator that is driven by the engine 104, and operates as an electric motor that is capable of starting the engine 104. The motor-generator MG2 is incorporated into the hybrid vehicle 100 as an electric motor that drives the wheel 102 that is a driving wheel of the hybrid vehicle 100.

The motor-generators MG1, MG2 are both three-phase alternating current motors, for example. The motor-generators MG1, MG2 each includes a three-phase coil that is made up of a U-phase coil, a V-phase coil, and a W-phase coil, as a stator coil.

The motor-generator MG1 generates three-phase alternating-current voltage using engine output, and outputs this generated three-phase alternating-current voltage to the inverter 120. The motor-generator MG1 generates driving force by the three-phase alternating-current voltage received from the inverter 120, and starts the engine 104.

The motor-generator MG2 generates driving torque for the vehicle by the three-phase alternating-current voltage received from the inverter 130. The motor-generator MG2 generates three-phase alternating-current voltage and outputs it to the inverter 130 during regenerative braking of the vehicle.

A secondary battery such as a nickel-metal hydride battery, a lithium-ion battery, or a lead battery, for example, may be used as the battery B. Also, a large capacity electric double layer capacitor may also be used instead of the battery B.

The hybrid vehicle 100 in this example embodiment is configured to be able to charge the battery B by receiving power supplied from an external power supply such as a household power supply.

More specifically, the hybrid vehicle 100 has a charging portion 191. An AC/DC converter 140 and a switching mechanism 150 are provided between the charging portion 191 and the battery B. The AC/DC converter 140 converts alternating-current current supplied from the external power supply through the charging portion 191 to direct-current current, and converts it to a predetermined voltage. The switching mechanism 150 is provided between the AC/DC converter 140 and the battery B. The switching mechanism 150 switches the conduction state between the AC/DC converter 140 and the battery B ON/OFF based on a signal from the vehicle ECU 160.

In this example embodiment, the charging portion 191 is provided on a front fender on a driver seat side. More specifically, a power supply compartment 31 that houses the charging portion 191, and a lid 32 that enables the power supply compartment 31 to be opened and closed, are provided in the front fender. The location where the charging portion 191 is arranged is not limited to the front fender on the driver seat side, and may also be a rear fender or a front fender on a passenger seat side or the like, for example.

A charging cable 21 is used when charging the hybrid vehicle 100. The charging cable 21 is carried in an appropriate position in the hybrid vehicle 100, and is used pulled out from this carry position during charging. The charging cable 21 may also be a cable that is permanently installed at a charging station or the like.

The charging cable 21 is formed from a long electric cable, and has a power plug 22 on one end and a charging connector 23 on the other end. The power plug 22 is provided connectable to an external power supply such as a household power outlet. The charging connector 23 is provided connectable to the charging portion 191 that is provided on the vehicle main body side. When charging the battery B, the power plug 22 and the charging connector 23 are connected to the external power supply and the charging portion 191, respectively, and power is supplied from the external power supply to the vehicle main body side through the charging cable 21.

Continuing on, the structure of the charging portion 191 provided in the hybrid vehicle 100 will be described in detail.

Figure 3:
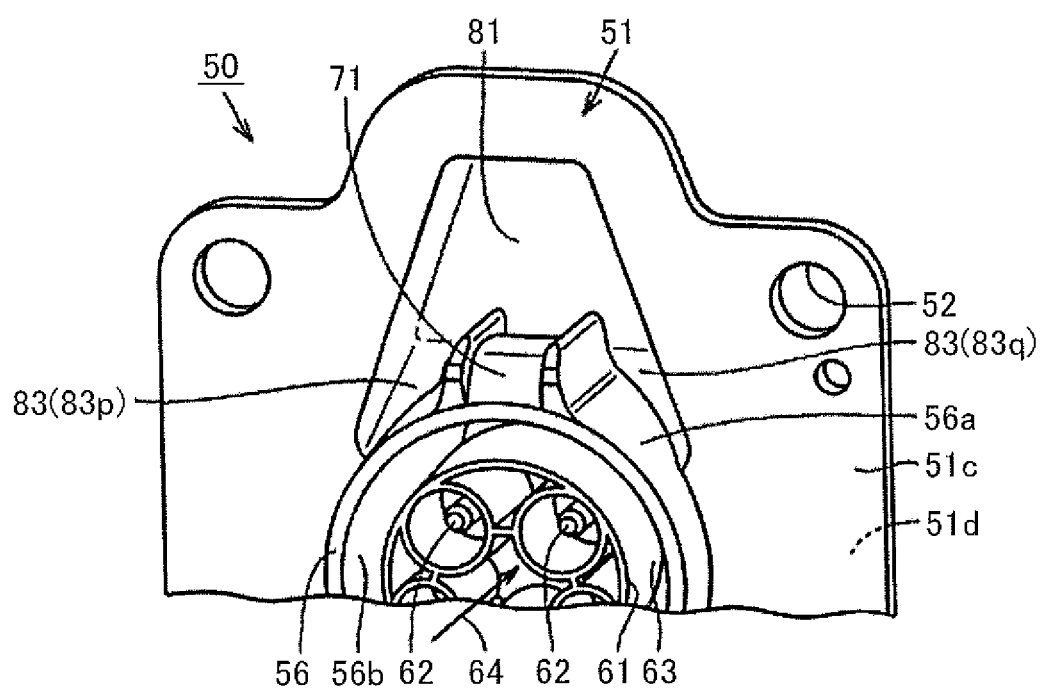
FIG. 3 is a front view of an inlet of an example embodiment of the invention, which is provided in a charging portion in FIG. 1.

FIG. 3 is a front view of an inlet according to the example embodiment of the invention, which is provided in the charging portion in FIG. 1. Referring to FIG. 3, the inlet 50 according to the example embodiment of the invention is provided in the hybrid vehicle 100, as a socket into which the charging connector 23 is plugged. The inlet 50 is attached to a body of the vehicle, in the power supply compartment 31 in FIG. 1.

The inlet 50 in this example embodiment includes a terminal portion 61, a guide wall 56, a flange portion 51, and a lever retaining portion 71.

The terminal portion 61 has a plurality of connecting pins 62. The plurality of connecting pins 62 are provided spaced apart from each other. The plurality of connecting pins 62 extend in pin shapes in the same direction. In this example embodiment, the plurality of connecting pins 62 are formed of a total of five pins, i.e., two for a power cable through which current for charging the battery flows, one for an earth, and two for signal lines.

The guide wall 56 has a cylindrical shape. The guide wall 56 extends in a cylindrical shape in a direction parallel to the direction in which the connecting pins 62 extend. The guide wall 56 has a circular cylindrical shape. The terminal portion 61 is arranged to the inside of the guide wall 56 having the cylindrical shape. The guide wall 56 is provided surrounding an outer periphery of the terminal portion 61.

The guide wall 56 has an outer peripheral surface 56a and an inner peripheral surface 56b. The inner peripheral surface 56b faces to the inside of the guide wall 56 that surrounds the terminal portion 61. The outer peripheral surface 56a is a back side of the inner peripheral surface 56b, and faces to the outside of the guide wall 56. A gap 63 that extends in an annular shape is formed between the guide wall 56 and the terminal portion 61.

The flange portion 51 is provided on an outer periphery of the guide wall 56. The flange portion 51 has a plate shape. The flange portion 51 has a shape that spreads out in a flange shape from the outer peripheral surface 56a of the guide wall 56. The guide wall 56 is provided in a cylindrical manner passing through the flange portion 51. The guide wall 56 and the flange portion 51 are integrally formed by resin. The flange portion 51 is fixed to the body of the vehicle using a fastening member that is not shown. A through-hole 52 used when fastening the inlet 50 to the body of the vehicle is formed in the flange portion 51.

The flange portion 51 has a front surface 51c and a back surface 51d. The front surface 51c faces to the outside of the vehicle. The back surface 51d is the back side of the front surface 51c, and faces the body of the vehicle to which the flange portion 51 is fixed.

The lever retaining portion 71 is provided on the outer periphery of the guide wall 56. The lever retaining portion 71 has a shape that protrudes from the outer peripheral surface 56a of the guide wall 56. The lever retaining portion 71 is provided on a vertically upper side of the guide wall 56.

Figure 4:
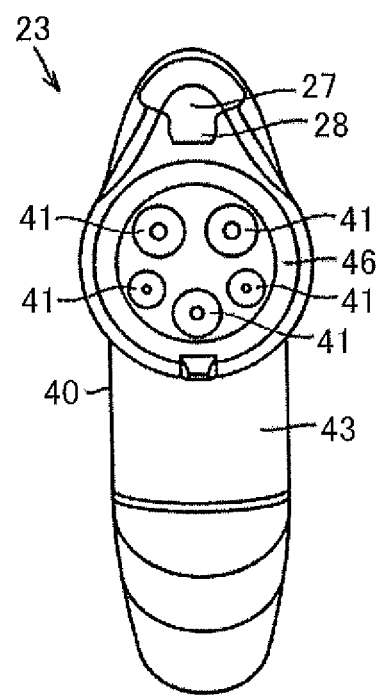
FIG. 4 is a front view of a charging connector that is connected to the inlet in FIG. 3.
Figure 5:
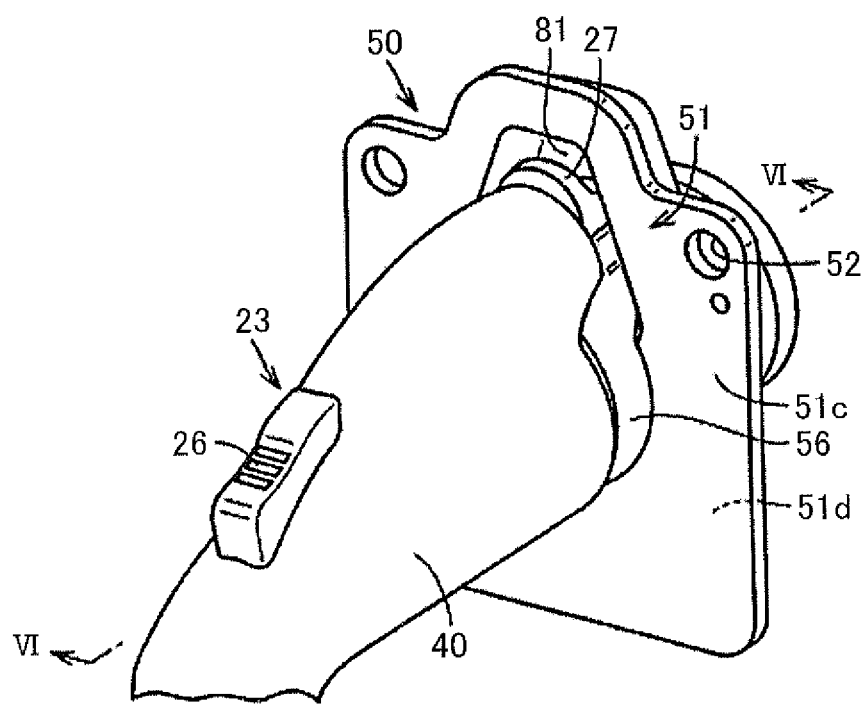
FIG. 5 is a perspective view illustrating a state in which the charging connector is connected to the inlet in FIG. 3.
Figure 6:
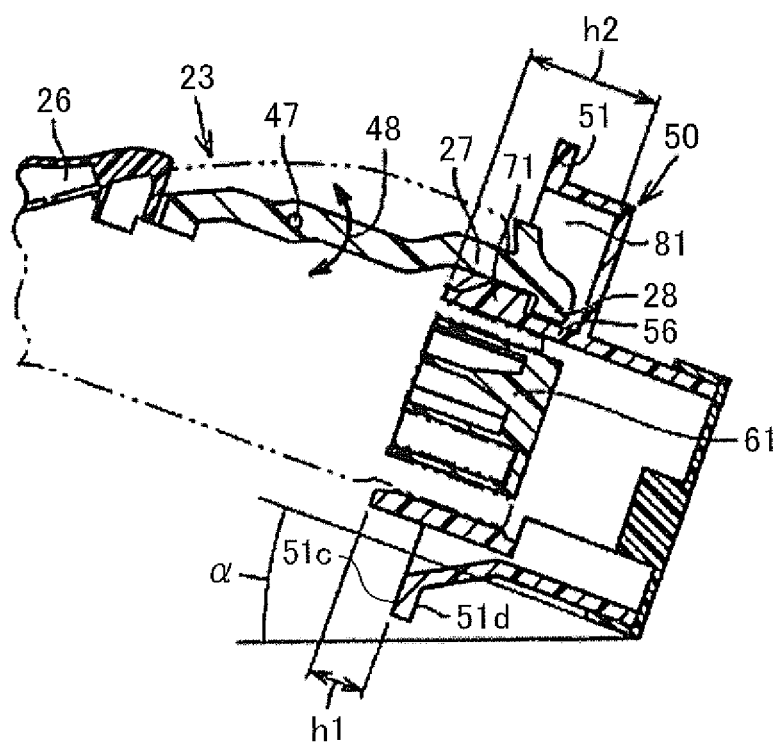
FIG. 6 is a sectional view of the inlet and the charging connector taken along line VI-VI in FIG. 5.

FIG. 4 is a front view of a charging connector that is connected to the inlet in FIG. 3. FIG. 5 is a perspective view illustrating a state in which the charging connector is connected to the inlet in FIG. 3. FIG. 6 is a sectional view of the inlet and the charging connector taken along line VI-VI in FIG. 5.

Referring to FIG. 3 to FIG. 6, the charging connector 23 has a main body case portion 40, a lock release button 26, a plurality of fitting portions 41, a cylindrical portion 46, and a lever 27.

The main body case portion 40 forms the exterior of the charging connector 23. A grip portion 43 is integrally formed on the main body case portion 40. The grip portion 43 has a grip shape that is able to be held by a worker. The lock release button 26 is provided on the main body case portion 40. The lock release button 26 is provided as an operating portion for unlocking the charging connector 23, and is pushed down when removing the charging connector 23 from the inlet 50 after charging is finished.

The plurality of fitting portions 41 are provided in a manner protruding from one end surface of the main body case portion 40. The plurality of fitting portions 41 are provided in positions corresponding to the plurality of connecting pins 62, respectively, and in this example embodiment, five of the fitting portions 41 are provided. When connecting the charging connector 23 to the inlet 50, the plurality of connecting pins 62 on the inlet 50 side are fit together with the plurality of fitting portions 41, respectively.

The structure of the electrical connection between the inlet 50 and the charging connector 23 is not limited to the pin structure described above, and may be modified appropriately.

The cylindrical portion 46 is provided in a manner protruding in a cylindrical shape from one end surface of the main body case portion 40. The cylindrical portion 46 is formed in a circular cylindrical shape surrounding the plurality of fitting portions 41. When connecting the charging connector 23 to the inlet 50, the cylindrical portion 46 enters the gap 63 between the guide wall 56 and the terminal portion 61. As a result, the charging connector 23 to be connected to the inlet 50 is guided in the direction indicated by arrow 64 in FIG. 3 by the guide wall 56. That is, the connecting direction of the charging connector 23 is restricted by the guide wall 56, and this direction is the direction in which the guide wall 56 extends in the cylindrical shape.

As shown in FIG. 6, the lever 27 is provided protruding on one end surface of the main body case portion 40 from inside the main body case portion 40. The lever 27 is provided so as to be able to pivot in the direction indicated by arrow 48 about a rotating shaft 47 when the lock release button 26 is operated by a charging worker. A retaining catch 28 is provided on a tip end of the lever 27 that protrudes from one end surface of the main body case portion 40. This retaining catch 28 has a claw shape that is able to engage with the lever retaining portion 71.

When connecting the charging connector 23 to the inlet 50, the charging connector 23 is fixed and supported with respect to the inlet 50, by a retaining structure made up of the retaining catch 28 and the lever retaining portion 71.

The inlet 50 in this example embodiment also has a recessed portion 81. The recessed portion 81 is formed recessed toward the connecting direction of the charging connector 23 (the direction indicated by arrow 64 in FIG. 3) from the flange portion 51. The recessed portion 81 is provided such that the front surface 51c of the flange portion 51 has a recessed shape, and the back surface 51d of the flange portion 51 has a protruding shape.

The recessed portion 81 is provided adjacent to the guide wall 56. The recessed portion 81 is provided on the vertically upper side of the guide wall 56. The recessed portion 81 is provided directly above the guide wall 56. The recessed portion 81 is provided in a position overlapping with the lever retaining portion 71, when the inlet 50 is viewed from the connecting direction of the charging connector 23 (the direction indicated by arrow 64 in FIG. 3). That is, the recessed portion 81 is provided in a phase position that overlaps with the lever retaining portion 71, in a circumferential direction of the guide wall 56 that has the circular cylindrical shape.

The guide wall 56 is provided protruding in a cylindrical shape from the flange portion 51 and the recessed portion 81, when the inlet 50 is viewed from the connecting direction of the charging connector 23 (the direction indicated by arrow 64 in FIG. 3). As shown in FIG. 6, a protruding length h1 of the guide wall 56 based on the flange portion 51 is smaller than a protruding height h2 of the guide wall 56 based on the recessed portion 81.

At least a portion of the lever retaining portion 71 is arranged in the recessed portion 81. In this example embodiment, a portion of the lever retaining portion 71 is arranged in the recessed portion 81, and the remaining portion of the lever retaining portion 71 is arranged in a space above the front surface 51c of the flange portion 51, as shown in FIG. 6. A structure in which at least a portion of the lever retaining portion 71 is arranged in the recessed portion 81 is not an essential structure in the invention.

When connecting the charging connector 23 to the inlet 50, the lever 27 enters the recessed portion 81, and the retaining catch 28 provided on the tip end of the lever 27 is arranged in the recessed portion 81 in a state engaged with the lever retaining portion 71.

Figure 7:
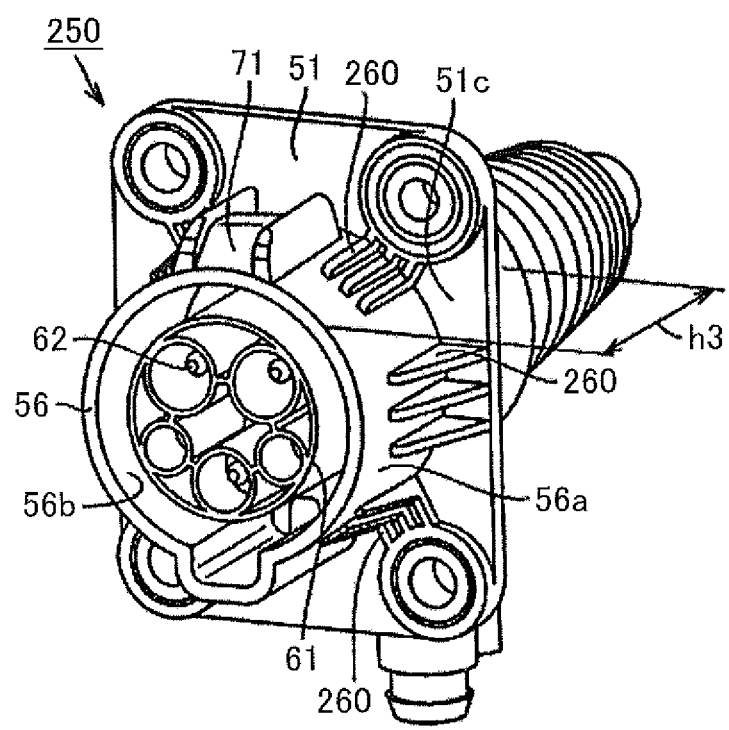
FIG. 7 is a perspective view of an inlet of a comparative example.
Figure 8:
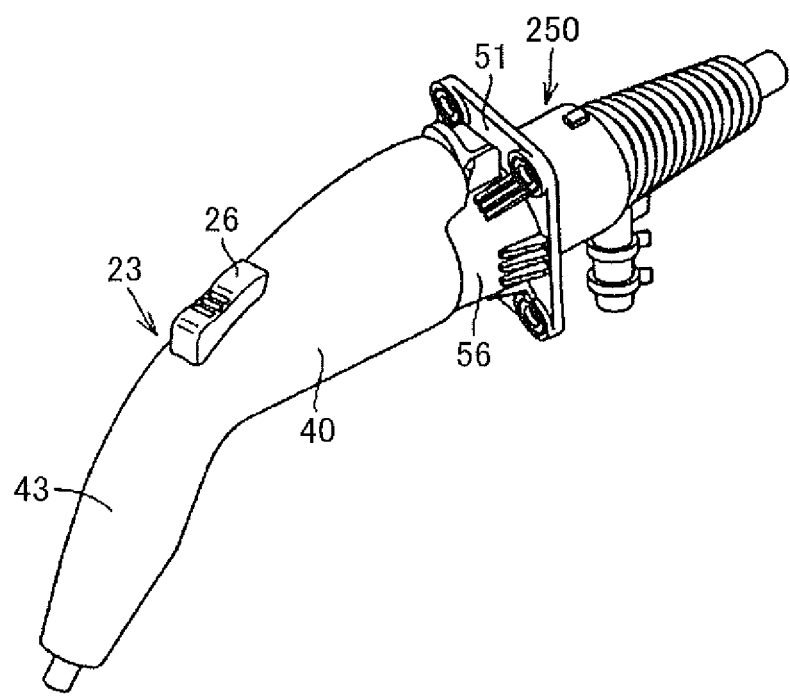
FIG. 8 is a perspective view illustrating a state in which a charging connector is connected to the inlet in FIG. 7.

FIG. 7 is a perspective view of an inlet of a comparative example. FIG. 8 is a perspective view illustrating a state in which a charging connector is connected to the inlet in FIG. 7.

Referring to FIG. 7 and FIG. 8, the recessed portion 81 in FIG. 3 is not provided in the flange portion 51, in an inlet 250 of this comparative example. In this case, when an attempt is made to ensure space for allowing the lever 27 to move in above the outer peripheral surface 56a of the guide wall 56, the lever retaining portion 71 must be provided in a position away from the flange portion 51, considering that the retaining catch 28 is positioned between the flange portion 51 and the lever retaining portion 71. Therefore, a protruding length h3 of the guide wall 56 from the flange portion 51 becomes larger.

If the protruding length h3 of the guide wall 56 from the flange portion 51 is large, the charging connector 23 will largely protrude from the vehicle car side while the charging connector 23 is connected to the inlet 250. Therefore, there is a greater likelihood that a person or a bag or the like will contact the charging connector 23, and it is conceivable that a force of up to 900 N will be applied to the charging connector 23. Also, if such a force is applied to the charging connector 23, stress generated at a base portion of the guide wall 56 will become large, so there is a need to provide ribs 260 at a corner portion of the guide wall 56 and the flange portion 51.

Referring to FIG. 3 and FIG. 6, in contrast to this, with the inlet 50 of the example embodiment, the recessed portion 81 is provided in a position overlapping with the lever retaining portion 71 when the inlet 50 is viewed from the connecting direction of the charging connector 23, so a configuration is able to be adopted in which the lever 27 enters the recessed portion 81 when connecting the charging connector 23 to the inlet 50. As a result, the lever retaining portion 71 is able to be provided even closer to the flange portion 51, and consequently, the protruding length of the guide wall 56 from the flange portion 51 is able to be smaller.

As a result, the likelihood of a person or a bag or the like contacting the charging connector 23 while the charging connector 23 is connected to the inlet 50 is able to be reduced. Also, even if a person or a bag were to contact the charging connector 23, the stress generated at the base portion of the guide wall 56 would be less. Therefore, the strength of the inlet 50 is able to be ensured with an even simpler structure, without providing a rib structure at the corner portion of the guide wall 56 and the flange portion 51.

Referring to FIG. 3 and FIG. 6, in the inlet 50 of this example embodiment, the flange portion 51 is fixed to the body of the vehicle, such that the guide wall 56 assumes a posture inclined vertically downward along the connecting direction of the charging connector 23 (the direction indicated by arrow 64). A vehicle mounting angle $\alpha$ in which the guide wall 56 is inclined with respect to a horizontal direction is 20°, for example. According to such a configuration, the socket of the inlet 50 faces upward at an angle, which makes it easier for the charging worker to connect the charging connector 23 to the inlet 50.

The recessed portion 81 has a bottom surface 83p and a bottom surface 83q (hereinafter, referred to as bottom surface 83 unless otherwise specified). The bottom surface 83 is formed continuous with the outer peripheral surface 56a of the second connecting face 65. The bottom surface 83p and the bottom surface 83q are provided sandwiching the lever retaining portion 71, on both sides thereof. The bottom surface 83 is formed inclined vertically downward along a near side from a far side in the recessed direction of the recessed portion 81 from the flange portion 51. The bottom surface 83 is formed having a slope greater than the vehicle mounting angle $\alpha$ with respect to the direction in which the guide wall 56 extends in the cylindrical shape.

In the inlet 50 of the example embodiment in which the recessed portion 81 is provided recessed from the flange portion 51, it is conceivable that rainwater and the like will get into the recessed portion 81. In particular, when the guide wall 56 is provided in an oblique direction such that the socket of the inlet 50 faces an upward direction at an angle, rainwater and the like will remain accumulated in the recessed portion 81.

On the other hand, in this example embodiment, rainwater and the like that has gotten into the recessed portion 81 is able to be discharged outside through the bottom surface 83, by inclining the bottom surface 83 of the recessed portion 81 vertically downward from the far side of the recessed portion 81 to the near side.

In summarizing the structure of the inlet of the example embodiment of the invention that has been described above, the inlet 50 of this example embodiment is an inlet to which the charging connector 23 is connected when charging the battery B as a power storage device mounted in the hybrid vehicle 100 as a vehicle from an external power supply. The inlet 50 includes the cylindrical guide wall 56 that guides the charging connector 23 to be connected to the inlet 50, the flange portion 51 that is provided in a plate shape on the outer periphery of the guide wall 56, and is fixed to the vehicle, the lever retaining portion 71 that is provided on the outer periphery of the guide wall 56, and retains the charging connector 23, and the recessed portion 81 that is provided in a position overlapping with the lever retaining portion 71 when viewed from the connecting direction of the charging connector 23, and is recessed toward the connecting direction of the charging connector 23 from the flange portion 51.

According to the inlet 50 of the example embodiment of the invention that is structured in this way, the likelihood of a person or a bag or the like contacting the charging connector 23 is able to be reduced by making the protruding length of the guide wall 56 from the flange portion 51 smaller. Also, even if a person or a bag or the like does contact the charging connector 23, the stress generated at the base portion of the guide wall 56 is able to be reduced.

The example embodiments disclosed herein are in all respects merely examples and should in no way be construed as limiting. The scope of the invention is indicated not by the foregoing description but by the scope of the claims, and is intended to include all modifications that are within the scope and meanings equivalent to the scope of the claims.

INDUSTRIAL APPLICABILITY

The invention is mainly used in a vehicle provided with an electric motor that is supplied with power from a battery, as a power source.

DESCRIPTION OF THE REFERENCE NUMERALS

21 CHARGING CABLE, 22 POWER PLUG, 23 CHARGING CONNECTOR, 26 LOCK RELEASE BUT-

TON, 27 LEVER, 28 RETAINING CATCH, 31 POWER SUPPLY COMPARTMENT, 32 LID, 40 MAIN BODY CASE PORTION, 43 GRIP PORTION, 46 CYLINDRICAL PORTION, 47 ROTATING SHAFT, 50, 250 INLET, 51 FLANGE PORTION, 51*c* FRONT SURFACE, 51*d* BACK SURFACE, 52 THROUGH-HOLE, 56 GUIDE WALL, 56*a* OUTER PERIPHERAL SURFACE, 56*b* INNER PERIPHERAL SURFACE, 61 TERMINAL PORTION, 62 CONNECTING PIN, 63 GAP, 71 LEVER RETAINING PORTION, RECESSED PORTION, 83, 83*p*, 83*q* BOTTOM SURFACE, 100 HYBRID VEHICLE, 102 WHEEL, 103 POWER SPLIT DEVICE, 104 ENGINE, 110, 140 CONVERTER, 120, 130, 120, 130 INVERTER, 150 SWITCHING MECHANISM, 191 CHARGING PORTION, 260 RIB

The invention claimed is:

1. An inlet to which a charging connector is connected when charging a power storage device from an external power supply, the power storage device being mounted in a vehicle, the inlet comprising:
   a guide wall that guides the charging connector, a shape of the guide wall being cylindrical;
   a flange portion that has a plate shape, the flange portion being provided on an outer periphery of the guide wall, and the flange portion being fixed to the vehicle;
   a retaining portion that is provided on the outer periphery of the guide wall, and the retaining portion being configured to retain the charging connector; and
   a recessed portion that is provided in a position overlapping with the retaining portion when viewed from a connecting direction of the charging connector, the recessed portion being recessed toward the connecting direction of the charging connector from the flange portion, the recessed portion being provided on a vertically upper side of the guide wall, and the recessed portion including a bottom surface that is inclined vertically downward along a near side from a far side in a recessed direction from the flange portion.

2. The inlet according to claim 1, wherein
   the flange portion is fixed to the vehicle such that the guide wall has a cylindrical shape and the guide wall extends in the connecting direction of the charging connector while inclining vertically downward.

3. The inlet according to claim 1, wherein
   at least a portion of the retaining portion is arranged in the recessed portion.

4. The inlet according to claim 1, wherein
   the guide wall has a cylindrical shape and the guide wall protrudes from the flange portion and the recessed portion when viewed from the connecting direction of the charging connector; and
   a protruding length of the guide wall based on the flange portion is smaller than a protruding length of the guide wall based on the recessed portion.

5. The inlet according to claim 1, wherein the guide wall and the flange portion are integrally formed and made of resin.

* * * * *